United States Patent [19]

Brokamp et al.

[11] Patent Number: 5,437,439
[45] Date of Patent: Aug. 1, 1995

[54] RUBBER BEARING FOR THE CENTRAL PIN OF A LEAF SPRING SUSPENSION IN A MOTOR VEHICLE

[75] Inventors: Susanne Brokamp, Damme; Hubert Siemer, Dinklage, both of Germany

[73] Assignee: Lemeörder Metallwaren AG, Lemförde, Germany

[21] Appl. No.: 210,216

[22] Filed: Mar. 18, 1994

[30] Foreign Application Priority Data

Mar. 24, 1993 [DE] Germany .................... 43 09 425.3

[51] Int. Cl.⁶ .................................... B60G 11/24
[52] U.S. Cl. .................................... 267/293; 267/294
[58] Field of Search ............... 267/293, 294, 141.1, 267/141.3, 141.4, 141.5; 384/220, 221, 276, 294, 295, 296, 297

[56] References Cited

U.S. PATENT DOCUMENTS

| | | | |
|---|---|---|---|
| 3,022,126 | 2/1962 | Siebert | 384/296 |
| 4,707,149 | 11/1987 | Hahle | 384/294 |
| 5,169,244 | 12/1992 | Siebert et al. | 384/276 |
| 5,192,137 | 3/1993 | Renard | 384/296 |

FOREIGN PATENT DOCUMENTS 589416 12/1956 Canada ........................ 384/276
3903350 8/1990 Germany .

*Primary Examiner*—Robert J. Oberleitner
*Assistant Examiner*—Chris Schwartz
*Attorney, Agent, or Firm*—McGlew and Tuttle

[57] ABSTRACT

A rubber bearing for the central pin of a leaf spring suspension in a motor vehicle includes a housing split in an axial plane and of a rubber bushing (1), which is arranged on the pin with radial pretension and includes two half shells (3, 4), which are axially fixed on the pin by at least one radially engaging tongue-and-groove assembly (8, 9), whose abutting surfaces, which are located opposite each other in the assembled state, are at a distance from one another peripherally in the preassembled state. The half shells (3, 4) of the rubber bushing (1) in this rubber bearing are connected to one another at their ends by flexible webs (5) and have recesses (12), which accommodate the webs (5) folding in during the radial compression.

9 Claims, 2 Drawing Sheets

RUBBER BEARING FOR THE CENTRAL PIN OF A LEAF SPRING SUSPENSION IN A MOTOR VEHICLE

FIELD OF THE INVENTION

The present invention pertains to a rubber bearing for the central pin of a leaf spring suspension in a motor vehicle including a housing which is split in an axial plane and is formed of two half shells and of a rubber bushing, which is arranged on the central pin with radial pretension, the two half shells are fixed axially on the pin by at least one radially engaging tongue and groove arrangement, wherein the abutting surfaces, which are located opposite in the assembled state, are at a spaced location from one another peripherally in the assembled state.

BACKGROUND OF THE INVENTION

In the design as a bearing for a stabilizer, these design features have been known from DE-39,03,350 C1. This document discloses, for a split bearing, a rubberized metal bushing, in which the rubber body is arranged between an inner sheet-metal shell and an outer sheet-metal shell. The sheet-metal shells have, in a preassembled state, a peripheral distance from one another in the plane of division. This distance is greater than at the two inner half shells, so that they come into contact sooner with their opposite abutting surfaces than do the opposite abutting surfaces of the two outer half shells. As a result, it is possible to obtain a predetermined rigidity characteristic of the rubber bushing. The two half shells of the rubberized metal part are held together by a rubber layer, which is vulcanized on the inner jacket of the two inner half shells made of sheet metal, bridges over a division gap, and is open only at the other division gap.

Providing a split rubber bushing for a bearing of a similar design with metallic inserts, which are also designed as half shells, has been known from DE-35,31,340 C2.

SUMMARY AND OBJECTS OF THE INVENTION

The object of the present invention is to design a rubberized metal bushing for a rubberized metal bearing of the design described in the introduction such that its handling on the way from manufacture to assembly and during assembly will be optimized and designed as a less expensive process without impairment of function.

According to the invention, a rubber bearing for a central pin of a leaf spring suspension in a motor vehicle is provided comprising a housing which is split in an axial plane. The housing is formed of two half shells with a rubber bushing. The rubber bushing is arranged on the pin with radial pretension and consists of two half shells fixed axially on the pin by at least one radially engaging tongue and groove assembly. The half shells include abutting surfaces, which are located opposite each other in the assembled state and are at a spaced location from one another peripherally in the preassembled state. The rubber bushing half shells are connected to one another at their ends by flexible webs at a distance which makes it possible to axially push the radially expanded rubber bushing onto the pin. The rubber bushing half shells are provided with recesses which accommodate the webs folding in during the radial compression.

It is achieved by these design features that the known one-part manufacture of such a rubber bushing, in which the two shell halves do, however, have a relatively stable connection, is maintained. As a result, the packaging of the rubber bushing at its site of manufacture, the transportation to the site of assembly, which is frequently very long, and, finally, also the assembly of the rubber bearing are facilitated. The connection of the two half shells at both ends of tile rubber bushing guarantees accurate positioning of the two half shells in relation to one another during assembly, and it facilitates the clamping in of tile half shells by the half shells of the likewise split housing. This effect is supported by tile fact that the webs connecting the two half shells of the rubber bushing are slightly shorter than the radial dimension of the tongue-and-groove design, whose tongue and groove interlock in the assembled state, so that the two connected half shells can be pushed onto the pin with a slight expansion of the webs connecting the half shells, until the tongue design snaps into the groove design. As a result, reliable prepositioning of the rubber bushing is achieved, so that the placement of the half shells of the housing is facilitated.

In a rubber bearing according to tile present invention, the half shells of tile rubberized metal bushing may have, analogously to the arrangement known from DE-35,31,340 C2, half shell-like metallic inserts, and the abutting surfaces of these inserts, which are in contact with one another after assembly, project toward tile material of the rubber bushing in the preassembled state in order to influence tile rigidity of tile rubber bushing by a corresponding design.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
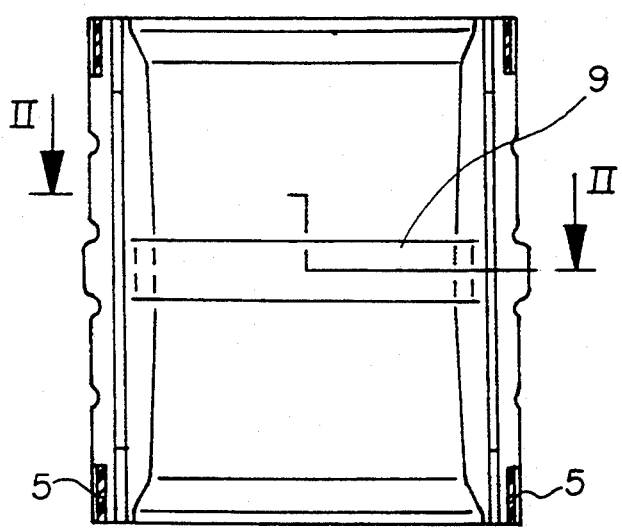
FIG. 1 is a sectional view through the plane of division of the rubber bushing along line I—I in FIG. 2.
Figure 2:
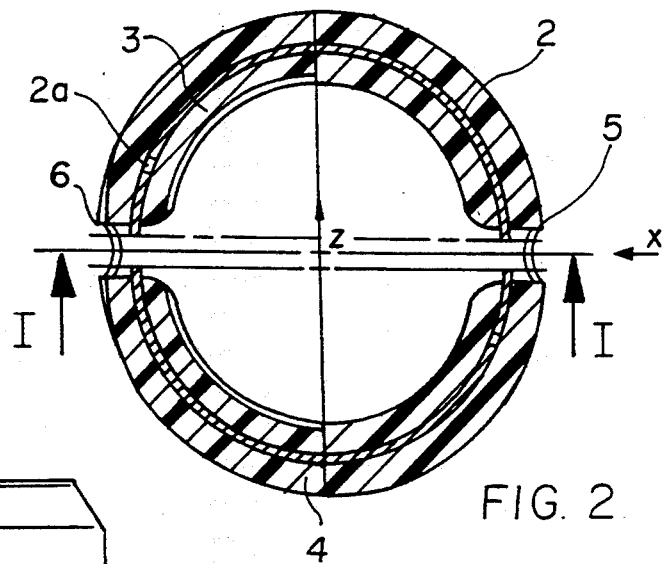
FIG. 2 is a cross sectional view along line II—II in FIG. 1.
Figure 3:
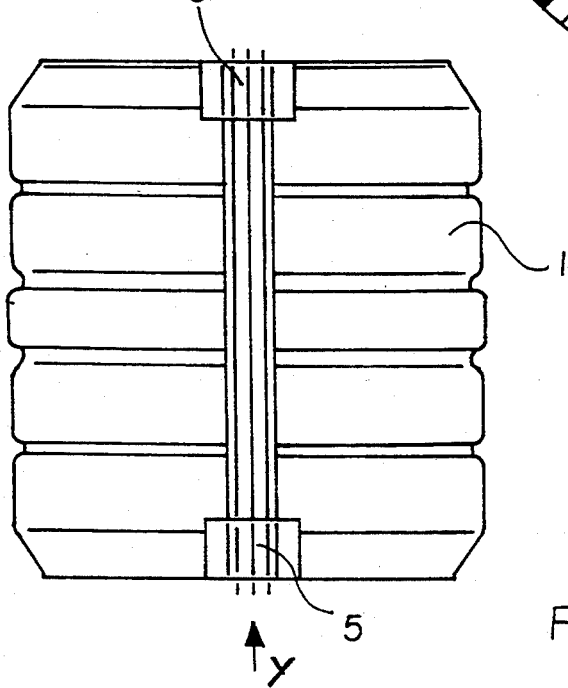
FIG. 3 is a view of the rubberized metal bushing.
Figure 4:
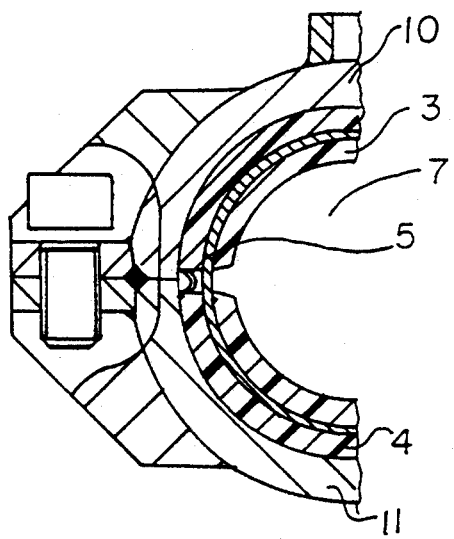
FIGS. 4 and 5 are a cross sectional view and a longitudinal sectional view of half of a rubber bearing.
Figure 5:
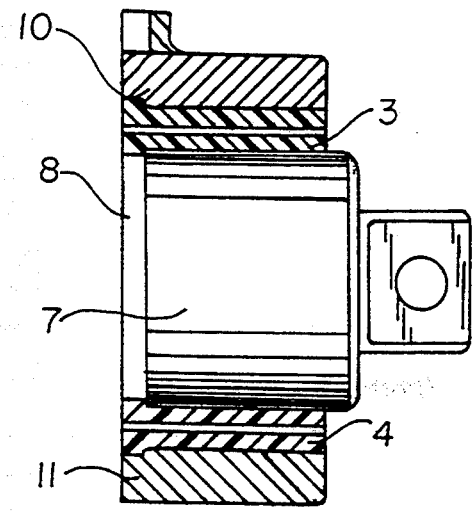
Figure 6:
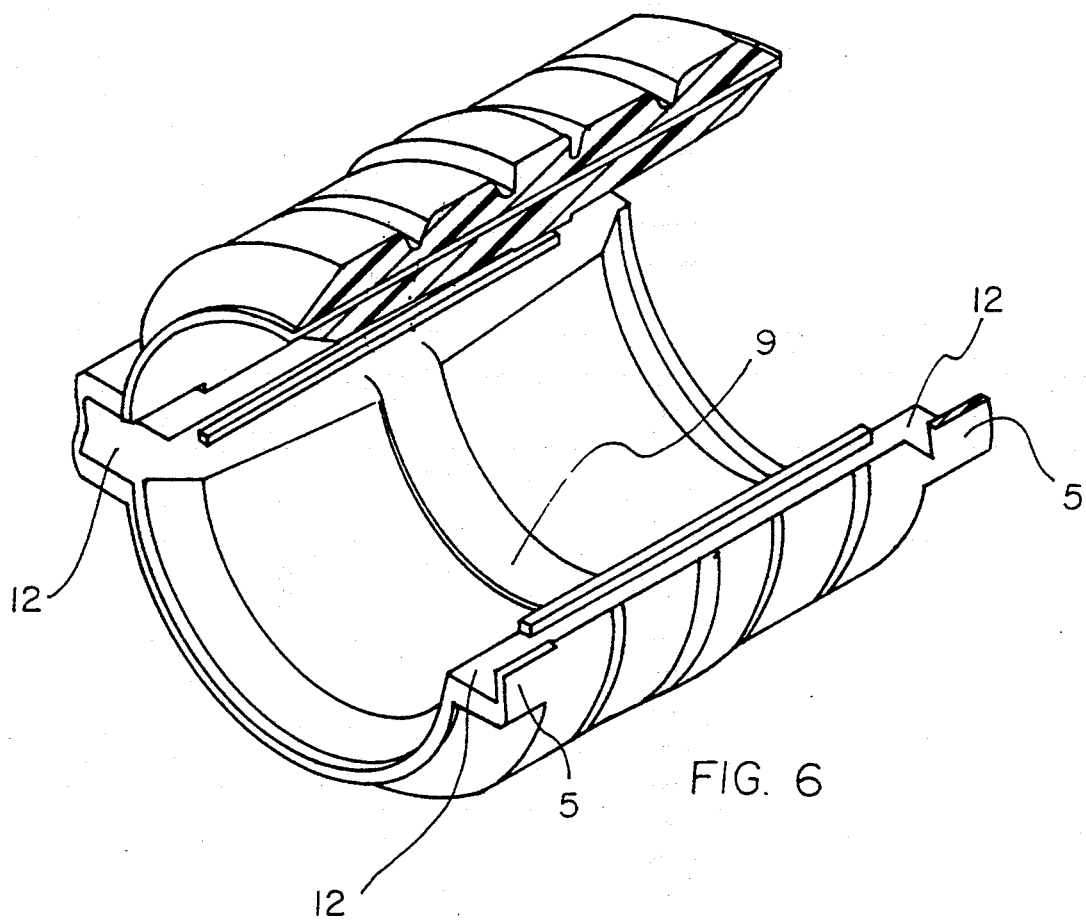
FIG. 6 is a perspective view of the rubber bushing with a longitudinal section in an axial plane.

The drawings show a rubber bushing 1 made of two half shells 3 and 4, each of which has a metal insert 2 made of sheet metal or the like. The outer layer and the inner layer of the elastic material are connected to one another through openings 2a of the metal insert 2. The two half shells 3 and 4 of the rubber bushing 1 are connected to one another at their ends by flexible webs 5 made of the same material, so that a gap 6 is formed in the preassembled state between tile abutting surfaces of the two half shells 3 and 4, which are in contact with one another after assembly. Corresponding to the representation in FIG. 2, the abutting surfaces of the metal inserts 2, which surfaces are in contact with one another after assembly, project forward in relation to the elastic material, so that they first come into mutual contact with one another during tile radial compression of the rubber bushing 1, so that different or equal pretension can be generated in the material located within the metal inserts and in the material located outside these metal inserts. A circumferential centering groove 8, which is engaged by a tongue 9 provided on the inner jacket (inner surface) of the two half shells 3 and 4, is arranged on the fastening pin 7 approximately centrally in tile rubber bearing. The length of the webs 5 between the two half shells 3 and 4 and the radial dimension of the centering groove 8 or of the tongue 9 are coordinated with one another such that it becomes possible to push tile rubber bushing 1 axially onto the pin 7 by a radial expansion of the rubber bushing 1 with a slight expansion of the webs. The rubber bushing is fixed by this pretension in the webs 5 on the pin 7 after it has been pushed on, so that the two half shells 10 and 11 of the housing can be assembled. The two half shells 3 and 4 are radially compressed during this assembly, and the abutting surfaces of the metal inserts 2 in the half shells 3 and 4, which abutting surfaces are located opposite each other, first come into contact with one another, before the abutting surfaces of the half shells 10 and 11 of the housing, which abutting surfaces are located opposite each other, come into mutual contact with one another. During this radial deformation of tile half shells 3 and 4 of the rubber bushing 1, the webs 5 are folded inward, corresponding to the representation in FIGS. 4 and 6, and are accommodated by recesses 12, which are provided in the outer layer of the elastomeric material of tile rubber bushing 1. Positioning grooves, which are engaged by the half shells 10 and 11 of the housing with a complementary profile in order to axially fix the rubber bushing 1 in relation to the half shells 10, 11 of the housing as well, are provided on the outside of the rubber bushing 1. To avoid overstressing, it is also permissible to allow a sliding movement between the inner jacket of tile half shells 3 and 4 and the outer jacket of tile pin 7 or tile outer jacket of tile half shells 3 and 4 and the inner jacket of the half shells 10 and 11 of tile housing, so that excessive shear stresses in the material of the rubber bushing 1 are avoided.

While specific embodiments of the invention have been shown and described in detail to illustrate the application of the principles of the invention, it will be understood that the invention may be embodied otherwise without departing from such principles.

What is claimed is:

1. A rubber bearing in combination with a central pin of the leaf spring suspension in a motor vehicle, comprising:
   a housing split in an axial plane to form two housing half shells;
   a rubber bushing arranged on the central pin with radial pretension, said rubber bushing being formed of two rubber bushing half shells;
   a tongue provided on an inner surface of said rubber bushing, said tongue extending radially to engage a centering groove provided on the central pin, wherein abutting surfaces of said rubber bushing are located opposite each other in an assembled state and are at a spaced location from one another peripherally in a preassembled state, said rubber bushing half shells being connected to one another at their ends by flexible webs, said flexible webs for maintaining said two rubber bushing half shells joined during a radial expansion of said rubber bushing as said rubber bushing is pushed onto the central pin, each of said rubber bushing half shells having recesses for accommodating the webs whereby said webs fold inwardly upon radial compression of said rubber bushing.

2. A rubber bearing according to claim 1, wherein: said webs connecting said rubber bushing half shells are slightly shorter than a radial dimension of said tongue.

3. A rubber bearing according to claim 1, wherein: said rubber bushing half shells each have metal inserts with abutting surfaces, which are in contact with one another after assembly, and which project forward in relation to the material in the rubber bushing in the preassembled stated.

4. A rubber bearing according to claim 2, wherein: said rubber bushing half shells each have metal inserts with abutting surfaces, which are in contact with one another after assembly, and which project forward in relation to the material in the rubber bushing in the preassembled stated.

5. A rubber bearing according to claim 1, wherein said webs have a length dimension which is shorter than a radial dimension of said tongue.

6. A rubber bearing according to claim 6, wherein said rubber bushing half shells each have metal inserts with abutting surfaces, said metal inserts being in contact with one another after assembly, said rubber inserts projecting forward in relation to material forming said rubber bushing, in a preassembled state.

7. A rubber bearing in combination with a central pin of a leaf spring suspension in a motor vehicle, comprising:
   a housing split in an axial plane to form two housing half shells;
   a rubber bushing arranged on the central pin with radial pretension, said rubber bushing being formed of two rubber bushing half shells, abutting surfaces of said rubber bushing being located opposing one another in an assembled state and being spaced apart from one another in a preassembled state, said rubber bushing half shells being connected to one another at their ends by flexible webs for maintaining said two rubber bushing half shells joined in said preassembled state and for extending to enlarge a distance between said two half shells during a radial expansion as said rubber bushing is pushed onto the central pin, each of said rubber bushing half shells having recesses for accommodating said webs, whereby said webs fold inwardly, into said recesses, upon radial compression of said rubber bushing.

8. A rubber bearing according to claim 7, further comprising a tongue provided on an inner surface of said rubber bushing, said tongue extending radially to engage a centering groove provided on the central pin.

9. A rubber bearing according to claim 7, wherein said rubber bushing half shells each have metal inserts with abutting surfaces, said metal inserts being in contact with one another after assembly, said rubber inserts projecting forward in relation to material forming said rubber bushing, in a preassembled state.

* * * * *

UNITED STATES PATENT AND TRADEMARK OFFICE
CERTIFICATE OF CORRECTION

PATENT NO. : 5,437,439
DATED : August 1, 1995
INVENTOR(S) : BROKAMP et al.

It is certified that error appears in the above-identified patent and that said Letters Patent is hereby corrected as shown below:

On the title page, item:

[73] Assignee: Lemförder Metallwaren AG, Lemförde, Germany

Signed and Sealed this

Third Day of October, 1995

Attest:

BRUCE LEHMAN

Attesting Officer — Commissioner of Patents and Trademarks